United States Patent

[11] 3,586,187

| [72] | Inventor | Preston M. Wright |
| | | R.R. 2, Box 110A, Syracuse, Ind. 46567 |
| [21] | Appl. No. | 804,818 |
| [22] | Filed | Mar. 6, 1969 |
| [45] | Patented | June 22, 1971 |

[54] AIRCRAFT TOWING APPARATUS
7 Claims, 6 Drawing Figs.

[52] U.S. Cl. ................................................. 214/332
[51] Int. Cl. ................................................. B60s 9/20
[50] Field of Search ..................................... 214/330, 331, 332, 334

[56] References Cited
UNITED STATES PATENTS
2,874,861 2/1959 Arnot ........................... 214/332
2,877,911 3/1959 Arnot ........................... 214/332

Primary Examiner—Gerald M. Forlenza
Assistant Examiner—George F. Abraham
Attorney—Woodard, Weikart, Emhardt & Naughton ABSTRACT: The present invention is embodied in a powered towing apparatus for aircraft in which the aircraft and the driving wheels of the prime mover, or tractor component, are connected by a linkage which transfers a portion of the aircraft weight to the driving wheels to aid traction. The linkage grasps only the nose wheel tire on the aircraft and lifts the aircraft nose wheel through this tire grip. The tire gripping components adapt to a wide range of aircraft nose wheel tire size variations, both as to tire width and wheel diameter.

PATENTED JUN22 1971
3,586,187
SHEET 1 OF 2
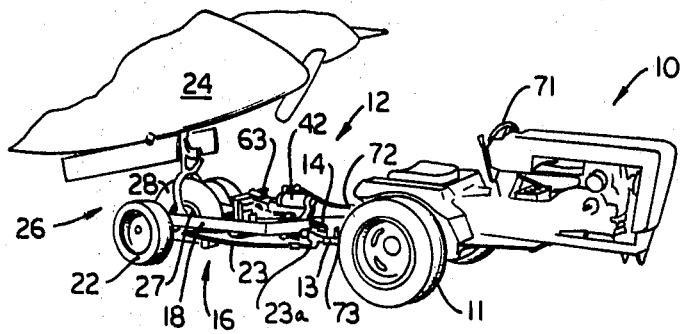
Fig. 1.
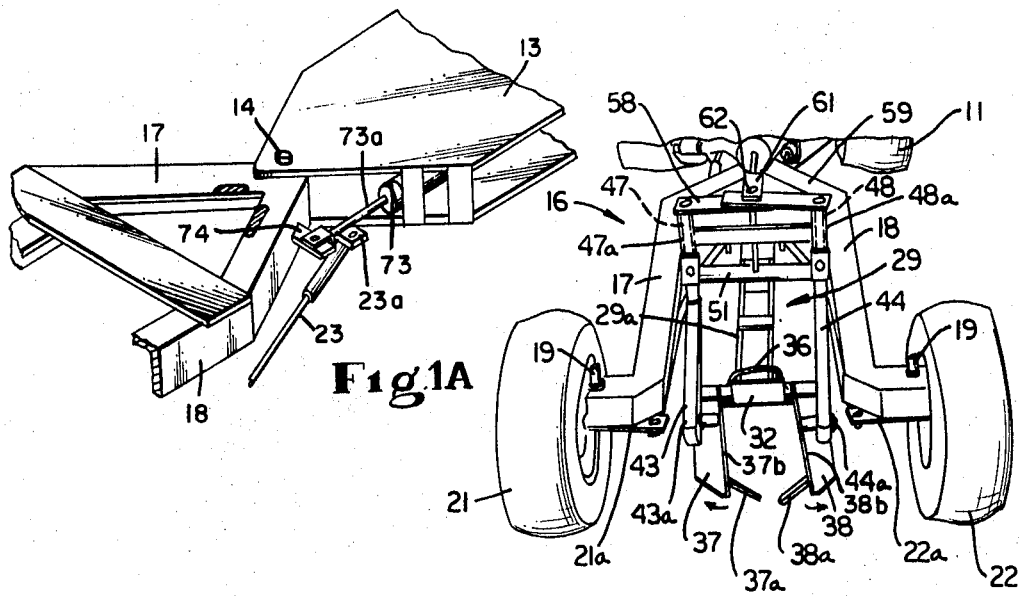
Fig.1A
Fig.2
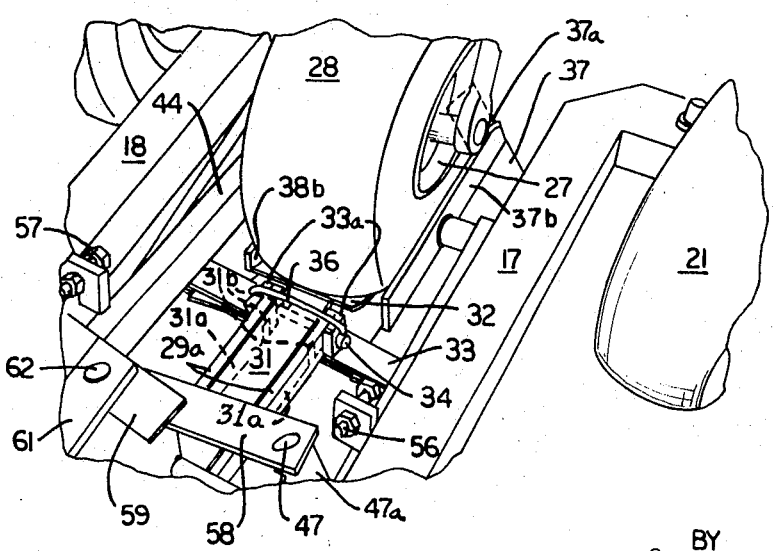
Fig. 3.
INVENTOR
PRESTON M. WRIGHT
BY
Woodard, Weikart, Emhardt & Naughton
Attorneys

AIRCRAFT TOWING APPARATUS

BACKGROUND OF THE INVENTION

1. Field of the Invention

The apparatus broadly, is a motor vehicle of the driven, steering type which is adapted for raising the nose wheel of an aircraft from the ground and towing the aircraft over, for example, the ramp and hanger area of an airport. Increased use of private and light-commercial and executive aircraft has made highly desirable for aircraft facilities a towing apparatus for such aircraft which is relatively inexpensive and trouble free and which can be operated by relatively unskilled airport employees. Aircraft, of even the smaller, private type, represent a substantial investment and any damage to the landing gear of the aircraft, for example, during towing by airport employees can be costly for the responsible aircraft facility and, further, might be the proximate cause of subsequent landing accidents involving the tow-damaged aircraft, resulting in liability for much greater damage. The nose wheel structure in aircraft of the type under discussion is usually mounted on a swivel-caster assembly, the caster being capable of being swiveled only through a limited arc of the order of 30°. If, in towing, the nose wheel is turned through an arc exceeding this, damage to the caster structure will occur. Thus, if the powered tow apparatus is turned too short, turning the aircraft nose wheel beyond the limit of its caster mounting, damage to the nose wheel portion of the aircraft landing gear will occur. Occurrence of such damage cannot always be easily detected by the operator of the towing vehicle and, when it is detected, it often goes unreported. Additionally, since the design and actual physical size of the nose wheel and its carriage varies widely with the various makes of aircraft, any towing attachment specialized for one type or model of aircraft will, quite likely, be unsatisfactory for another type.

2. Description of the Prior Art.

Conventional light towing apparatus utilizes one form or another of a tow bar having a rigid, mechanical connection to the stem portion or yoke portion of the aircraft's nose wheel mounting. Typical of these are the structures disclosed in U.S. Pats. 2,919,933 and 3,049,253.

SUMMARY OF THE INVENTION

The apparatus of the present invention provides a connecting device between the aircraft nose wheel and the drive wheels of the towing apparatus which contacts only the tire of the nose wheel, thus providing a degree of resiliency for the connection. The connection adjusts itself to various nose wheel tire dimensions and transfers a portion of the weight of the aircraft itself to the drive wheels of the towing apparatus to enhance their traction.

BRIEF DESCRIPTION OF THE DRAWINGS

FIG. 1 is a perspective view of an aircraft towing apparatus embodying the present invention.

FIG. 1A is an enlarged, perspective view of the junction of the trailer and tractor components with certain parts removed to more clearly show the steering mechanism.

FIG. 2 is a perspective view showing a portion of the main frame of the apparatus and the associated parts.

FIG. 3 is an enlarged, fragmentary, perspective view of the apparatus shown in FIG. 2 with the nose wheel tire of an aircraft gripped between the shoe members.

DESCRIPTION OF THE PREFERRED EMBODIMENT

Figure 4:
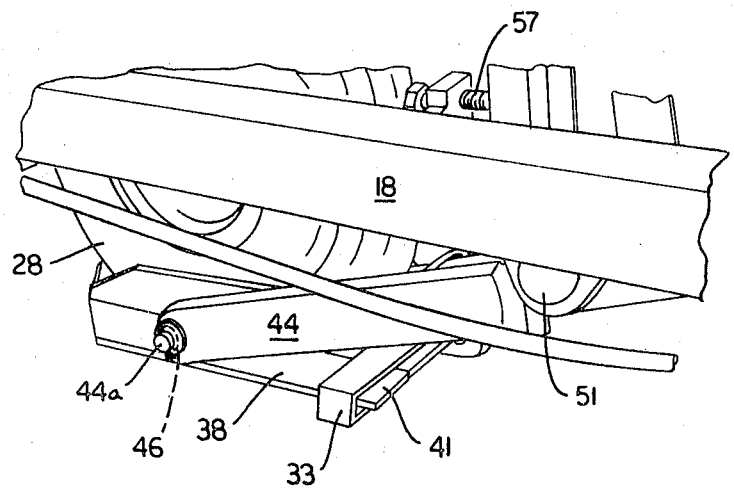
FIG. 4 is an enlarged, fragmentary, perspective view, taken from the side, showing the apparatus of FIG. 3.

Referring initially to FIG. 1, the aircraft towing apparatus embodying the present invention includes a tractor component indicated generally at 10 having powered drive wheels 11 and a towing frame 12. The towing frame is composed of a leading component 13 rigidly attached to the axle housing or similar part of the tractor component, this leading portion 13 of the frame having a pivotal connection by means of the pin 14 to the trailing frame portion indicated generally at 16. The pivotal attachment of the frame portion 16 with the frame portion 13 includes a further pivotal component (not shown) which permits limited tilting of the frame portion 16 transversely with relation to the frame portion 13 to thus permit motion of the frame portion 16 when the towing apparatus moves over uneven or rutted ground.

The trailing portion 16 of the towing frame 12 is bifurcated, as will be evident from FIG. 2, forming legs 17 and 18. Outwardly extending portions of the legs 17 and 18 support king pins 19 which pivotally support trailing wheels 21 and 22. Arms 21a and 22a (FIG. 2) have pivotal connection to stationary rods 23 (FIG. 1) which have pivotal connections at 23a to a transverse member rigidly secured to the stationary component 13 of the towing apparatus. The function of the rods 23 and the arms 21a and 22a is to assure that the trailing wheels 21 and 22 track with the wheels 11 in steering the apparatus, to be subsequently described.

As will be evident from FIG. 1, an aircraft 24 having a depending nose wheel caster 26 is supported by a nose wheel 27 carrying a nose wheel tire 28. As may best be seen in FIG. 2, a member 29, composed of spaced walls 29a is rigidly secured to the apex portion of the frame 16 and extends centrally between the legs 17 and 18. Received between the walls 29a is a channel shaped member 31 positioned so that its side flanges (31a in FIG. 3) extend downwardly, which, at its free end carries a central abutment 32. A generally rectangular, centrally slotted retaining member 33 is pivotally attached, by means of flanges 33a (welded to and extending upwardly from the member 33) and pin 34 (FIG. 3) to the member 29. The pin 34 extends through two of a series of registering slots (31b in FIG. 3) (not shown) in the depending side flanges 31a of the channel shaped member 31 Alternate positioning of registering pairs of the slots over the pin which permits adjustable positioning of the central abutment 32 outwardly from its extreme inward position of FIGS. 2 and 3. A flexible member 36 (FIG. 2) is secured to opposite ends of the pin 34 and extends over the member 31 serving to retain it within the sidewalls 29a (FIG. 3) but permitting the member 31 to be adjustably withdrawn longitudinally from between the walls 29a.

Opposed shoes 37 and 38, which may be formed with an angle iron configuration, with horizontal flanges extending sidewardly and outwardly, extend between the legs 17 and 18 and are adapted to grasp by means of their vertical flanges (37b and 38b) the nose wheel tire of an aircraft. The shoes have skewed plates 37a and 38a extending angularly inwardly from the vertical flange of the shoes 37 and 38, respectively and these plates are positioned behind the aircraft nose wheel tire when the shoes are in tire grasping position as will be evident from FIG. 3. As may best be seen in FIG. 4, a portion of the vertical flange of the shoes is cut away permitting the flat end portions 41 to extend freely through the slot enclosed by the retaining member 33. The retaining member 33 thus serves to hold the end of the shoes loosely and permits limited transverse movement of the shoes. The inwardly extending portions 37a and 38a of the shoes, as will be evident from FIG. 3, extend across the tread area of the aircraft nose wheel tire while the vertical flange portions of the shoes grip, when closed toward each other, the sidewall of the aircraft nose wheel tire.

Motion for the shoes 37 and 38 is provided by means of a linkage which extends to a power means taking the form of a hydraulic cylinder 42 (FIG. 1). The linkage consists of lift arms 43 and 44 which are pivotally connected to the shoes 37 and 38 respectively by means of the pins 43a and 44a (FIG. 2). The pins, which extend from the vertical flanges of the shoes 37 and 38 extend through enlarged apertures, as indicated at 46 in FIG. 4 and this permits a limited swiveling movement of the shoes with relation to their respective lift arms.

Figure 5:
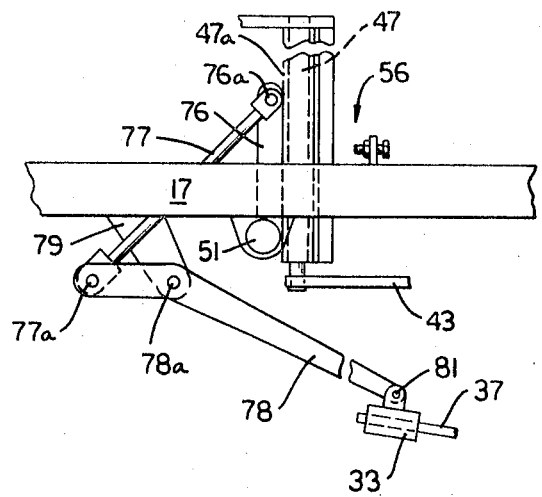
FIG. 5 is a fragmentary, side view illustrating a portion of the apparatus shown in the preceding Figures.

The lift arms 43 and 44 extend toward the apex of the frame portion 16 and are rigidly secured to the lower ends of upright shafts 47 and 48, respectively. The upright shafts are enclosed in bearing tubes 47a and 48a. The tubes are rigidly secured, by welding or other suitable means, to a generally horizontal rockshaft 51 which, as may best be seen in FIG. 2, spans the space between the frame legs 17 and 18 and is journaled in suitable bearings carried by the legs as indicated in FIGS. 4 and 5.

The upright shafts 47 and 48, since rigidly attached to the rockshaft 51, tilt longitudinally upon rotation of the rockshaft as will be subsequently referred to, and means for limiting the axial rotation of the rockshaft takes the form of stop abutments 56 and 57 (FIG. 3). The stop abutments 56 and 57 may specifically take the form of bolts threaded into threaded apertures in flanges extending from the frame members 17 and 18, this form of the abutments permitting adjustment of the position of the abutment with relation to the rockshaft and hence the position of the rockshaft at which the bearing tubes 47a and 48a, enclosing the upright shafts 47 and 48, engage the abutments to terminate rotation of the rockshaft.

As may best be seen in FIG. 2, rigidly secured to the upper end of the upright shafts 47 and 48 are sidewardly extending crank members 58 and 59. The free ends of the crank members 58 and 59 overlap and are pivotally joined to a U-shaped bracket 61 by means of the pin 62. Extending forwardly from the U-shaped bracket 61 and attached thereto is a rod 63 (FIG. 1) which is moved by the hydraulic cylinder 42 (FIG. 1) forming the power means for angularly moving the crank members 58 and 59 and hence the shafts 47 and 48 and the rockshaft 51.

A steering for the apparatus can be seen, fragmentarily, in FIG. 1 and, more clearly, in FIG. 1A. The steering wheel 71 of the tractor is connected suitable linkage to the hydraulic valve 72 which controls application of fluid pressure to two side-by-side mounted hydraulic cylinders, one of which is visible in FIG. 1 and in FIG. 1A identified at 73. The thrust rod 73a of the cylinder 73 is pivotally connected to a transverse bar 74 (FIG. 1A) rigidly attached at the apex of the frame portion 16 and the thrust rod of the corresponding hydraulic cylinder is connected to the opposite end of the bar 74 (not shown). The cylinders are connected so as to react oppositely upon an increase in pressure so that one thrust rod pulls and the other pushes, correspondingly, when the steering wheel is turned. In steering, with the drive wheels 11 moving the apparatus forwardly, when the steering wheel is turned the steering cylinders (73 and its companion) function to swing the trailing portion 16 of the apparatus about the pivotal connection 14. The stationary rods 23, secured rigidly at one end to the stationary portion 13 of the frame and at their opposite ends pivotally to the king pins 19 of the trailing wheels 21 and 22, serve to modify the position of the trailing wheels so that, in turning the apparatus, the trailing wheels 21 and 22 track with the powered drive wheels 11.

FIG. 5 illustrates in more detail the lever structure for maintaining the shoes 37 and 38 in a generally horizontal position as the lift arms 43 and 44 are raised and lowered in the operation of the apparatus. Referring to FIG. 5, it can be seen that the rockshaft 51 has rigidly attached to its outer surface and extending upwardly from the rockshaft axis, a lever 76 which is pivotally connected at 76a to 84 further link 77. The link 77 is pivotally connected at 77a to one end of a bell crank arm 78. The arm 78 is pivoted at 78a on a pin which extends through depending ears 79 which are rigidly attached to the frame members. The free end of the arm 78 is pivotally attached at 81 to the retaining member 33 which, as will be evident from FIG. 4, retains the ends of the shoes 37 and 38. As will be evident from FIG. 5, when the rockshaft 51 is rotated clockwise (as viewed in FIG. 5), the lever 76 will also move in a clockwise direction, raising the end 77a of the bell crank 78 and thereby lowering the end 81 of the bell crank 78 and the retainer 33 and, correspondingly, the extending ends of the shoes 37 and 38. The length of the various linkage elements and the levers are such that as the shoes are lowered or raised by the lift arms 43 and 44 the movement of the retaining member 33 by the bell crank 78 will be of a magnitude and direction sufficient to maintain the shoes substantially horizontal.

In operation, when the towing apparatus is to be moved into its position of FIG. 1 with relation to the nose wheel of an aircraft, the shoes 37 and 38 will be in an initial, raised or stowed position in which they are held above the ground by the upward tilting of the lift arms 43 and 44 and in which they are closed together somewhat more than shown in FIG. 2 where an intermediate position of the shoes and lift arms is illustrated. When the shoes are in stowed position the hydraulic cylinder 42 will have its thrust rod fully retracted and the arms 58 and 59 will have moved the upper ends of the upright shafts 47 and 48 toward the apex end of the frame portion 16 more than as illustrated in FIG. 2 and under these conditions the tilt arms 43 and 44 will have their upper ends raised somewhat from their position of FIG. 2 and the shoes 37 and 38, because of the position, rotationally, of the upright shafts 47 and 48, will be closed together so that the extending portions 37a and 38a engage each other. When the towing apparatus is to be moved into position with relation to an aircraft nose wheel, the hydraulic cylinder 42 will be actuated to extend its thrust pin moving the arms 58 and 59 toward the trailing wheels 21 and 22. This motion of the hydraulic cylinder thrust rod, through the arms 58 and 59 serves to tilt the upright shafts 47 and 48, causing rotation of the rockshaft 51. This rotation of the rockshaft results in a lowering of the ends of the lift arms 43 and 44 to which the shoes 37 and 38 are attached. In this portion of the cycle, the upright shafts 47 and 48 do not rotate axially but merely act as levers causing rotation of the rockshaft and tilting of the lift arms 43 and 44 which are attached to the lower ends of the upright shafts. Just prior to engagement of the ground by the shoes, or before their full weight is on the ground or supporting surface, the tubes 47a and 48a enclosing the shafts 47 and 48 engage their respective abutments 56 and 57 halting further tilting motion of the upright shafts and, consequently, further lowering of the shoes. This position of the apparatus is shown in FIG. 2.

At this point in the cycle, the hydraulic cylinder 42 is not fully extended and its thrust rod continues its motion toward fully extended position. Continued motion of the thrust rod of the hydraulic cylinder 42 toward extended position, since tilting motion of the shafts 47 and 48 is halted by the abutments 56 and 57, will produce axial rotation of the upright shafts 47 and 48 within the tubes 47a and 48a, the arms 58 and 59 acting as crank arms. Rotation of shaft 47 will be clockwise as viewed from its upper end (FIG. 2) and rotation of shaft 48 will be counterclockwise as viewed from its upper end. This rotation of the upright shafts causes the lift arms 43 and 44 to move angularly, swinging their ends attached to the shoes 37 and 38 outwardly away from each other thus spreading the shoes apart as indicated by the arrows adjacent the shoes 37 and 38 in FIG. 2. With the shoes spread apart or opened the towing apparatus may be backed into straddling relation to the aircraft nose wheel, as shown in FIG. 3.

When the aircraft nose wheel has engaged the plate 32, the hydraulic cylinder 42 may be actuated to move its thrust rod toward retracted position. This motion will cause the upright shafts 47 and 48 to rotate axially bringing the shoes 37 and 38 into engagement with the sidewall of the nose wheel tire, with the plates 37a and 38a extending across the tread area of the tire. The gripping of the nose wheel tire by the shoes 37 and 38 occurs at an intermediate portion of the retracting stroke of the hydraulic cylinder 42 and further retraction of the thrust rod of the cylinder, since further axial rotation of the upright shafts 47 and 48 is prevented by engagement of the shoes with the tire, results in tilting of the upright shafts 47 and 48, and rotation of the rockshaft 51, in a direction to raise the shoes and lift the aircraft nose wheel off of the ground or other supporting surface. With the aircraft nose wheel clear of the ground, the towing apparatus may be moved forwardly or rearwardly to place the aircraft to the desired position. When the aircraft has been towed or pushed to the desired position the actuation of the hydraulic cylinder 42 so as to extend its thrust rod will initially lower the aircraft nose wheel to the ground and then open or widen the space between the shoes 37 and 38, releasing the nose wheel tire from the towing apparatus. The towing apparatus may then be moved forwardly slightly, clearing the nose wheel from the shoes and the hydraulic cylinder 42 actuated so as to retract its thrust rod thereby closing the shoes together and raising them, by means of the tilt arms, to stowed position.

It will be noted that the apparatus described can accommodate itself to a wide range of small aircraft, having a widely varying nose wheel and tire dimensions without using special adapters to accommodate, for example, various nose wheel tire widths. Since the apparatus grasps or connects to the aircraft only through the somewhat resilient nose wheel tire and through the somewhat resiliently mounted shoes, the likelihood of damage to the aircraft nose wheel caster by sharp angle turning is minimized. The linkage system, including the lift arms, upright shafts and rockshaft are such as to place a clamping force or pressure on the sidewalls of the aircraft nose wheel tire when it is elevated which is a function of the weight of the aircraft. The positioning of the aircraft nose wheel forwardly somewhat of the axis of rotation of the trailing wheels 21 and 22 of the towing apparatus (as evident in FIGS. 1 and 3) insures that some of the weight of the aircraft itself will be transferred to the rotational axis of the drive wheels 11 of the towing apparatus thus enhancing traction of these wheels.

I claim:

1. An aircraft towing apparatus adapted to sequentially lift the nose wheel assembly of an aircraft and then move the aircraft, said apparatus comprising a tractor component having powered drive wheels, a towing frame extending rearwardly from the tractor component, said towing frame being bifurcated and carrying a trailing wheel adjacent the free end of each leg of the bifurcated frame, an adjustably positionable central abutment carried by the frame between said legs and adapted to be engaged by and define the depth of extension into the frame of an aircraft nose wheel, elongated shoes extending generally parallel to said frame legs and adapted to engage only the sidewalls of a nose wheel tire, plates on said shoes adapted to extend across the tread area of a nose wheel tire so that the load carried by the aircraft nose wheel is transferred to said shoes when the nose wheel is supported by the shoes, unitary power means on said frame for moving said shoes sequentially toward each other into nose wheel tire sidewall gripping position and then lifting said shoes and aircraft nose wheel clear of the ground, power transmitting linkage means extending between said shoes and said power means initially applying the force exerted by said power means as a nose wheel gripping force then as a lifting force on said aircraft nose wheels and increasing said gripping force to a magnitude which is a direct function of the aircraft weight as said aircraft nose wheel is lifted clear of the ground.

2. An aircraft towing apparatus as claimed in claim 1 in which said abutment and shoes are disposed forwardly, in towing direction, of the axis of rotation of said trailing wheels whereby when the aircraft nose wheel is raised by said shoes a portion of the load carried by the aircraft nose wheel is transferred to said powered drive wheels of the tractor component.

3. An aircraft towing apparatus as claimed in claim 1 in which said power transmitting linkage means comprises a generally horizontal rockshaft spanning the space between said frame legs and mounted on said legs for limited axial rotation, upright shafts mounted on said rockshaft adjacent the ends of the rockshaft and within the bight of said frame legs, said upright shafts being adapted for axial rotation independently of said rockshaft and for longitudinal tilting upon rotation of said rockshaft, crank member extending sidewardly from said upright shafts adjacent the upper ends of the shafts and adapted to be moved by said power means, lift arms extending rearwardly from said upright shafts adjacent their lower ends and each having a pivotal connection to an intermediate side portion of one of said shoes, the axis of said pivotal connections being generally parallel to said rockshaft, and stop abutment means carried by said frame for limiting the axial rotation of said rockshaft, whereby upon movement of said crank members by said power means in one direction said rockshaft is rotated to tilt said upright shafts and lower said shoes until said stop abutment means halts axial rotation of the rockshaft, continued movement of said crank members in said one direction then rotating said upright shafts axially to move said lift arms and consequently said shoes away from each other, subsequent movement of said crank members by said power means in the opposite direction initially closing said shoes toward each other and against an aircraft nose wheel tire positioned against said central abutment, continued movement of said crank members in the same direction then causing said rockshaft to rotate axially tilting said upright shafts to raise said shoes and the aircraft nose wheel clasped between them.

4. An aircraft towing apparatus as claimed in claim 3 in which a retaining member loosely holds the forward end portions of said shoes and linkage means mechanically connecting said retaining member and said rockshaft to raise and lower said retaining member as said rockshaft is axially rotated in a direction to raise and lower said shoes to thereby maintain a substantially horizontal attitude for said shoes.

5. An aircraft towing apparatus as claimed in claim 3 in which said power means takes the form of a hydraulic cylinder whose thrust rod has a pivotal connection to said crank members.

6. An aircraft towing apparatus as claimed in claim 3 in which said stop abutment means takes the form of adjustably positionable stops carried by said frame and adapted to limit the tilting movement of said upright shafts as said rockshaft rotates in the direction for lowering said shoes.

7. An aircraft towing apparatus as claimed in claim 3 in which said pivotal connection between each of the shoes and its corresponding lift arms includes a pivot pin extending through an enlarged aperture to permit limited swiveling movement of said shoes with relation to the lift arms.